«12» United States Patent
Kuraoka

(10) Patent No.: US 7,094,436 B2
(45) Date of Patent: Aug. 22, 2006

(54) **FROZEN PRODUCT OF RAW OR BOILED NOODLES OF JAPANESE BUCKWHEAT (*SOBA*)**

(75) Inventor: Nobuyoshi Kuraoka, 4-3-11-102, Roppongi, Minato-Ku, Tokyo 106-0032 (JP)

(73) Assignees: Nobuyoshi Kuraoka, Tokyo (JP); Kaoru Fujii, Kagawa (JP)

( * ) Notice: Subject to any disclaimer, the term of this patent is extended or adjusted under 35 U.S.C. 154(b) by 0 days.

(21) Appl. No.: 10/285,668

(22) Filed: Nov. 1, 2002

(65) Prior Publication Data
US 2004/0033301 A1 Feb. 19, 2004

(30) Foreign Application Priority Data
Aug. 16, 2002 (JP) ............................. 2002-237343

(51) Int. Cl.
*A23L 1/16* (2006.01)
(52) U.S. Cl. ...................... 426/557; 426/451
(58) Field of Classification Search ............... 426/557, 426/451, 656
See application file for complete search history.

(56) References Cited
U.S. PATENT DOCUMENTS
6,187,357 B1 *  2/2001  Meyer et al. ............... 426/502
6,403,127 B1 *  6/2002  Yamazaki et al. ............ 426/18
6,432,458 B1 *  8/2002  Yamazaki et al. ............ 426/18

FOREIGN PATENT DOCUMENTS
| JP | 1-127032 | | 5/1989 |
| JP | 8-280342 | | 10/1996 |
| JP | 411225695 | * | 8/1999 |
| JP | 2001-224299 | | 8/2001 |

* cited by examiner

*Primary Examiner*—Lien Tran
(74) *Attorney, Agent, or Firm*—Westerman, Hattori, Daniels & Adrian, LLP.

(57) ABSTRACT

The invention provides a frozen product of boiled noodles of Japanese buckwheat, which has an improved feel in eating and can sustain the improved feel in eating for a long term, and a chilled or frozen product of raw noodles of Japanese buckwheat, which has an improved feel in eating when boiled and can sustain the improved feel in eating for a long term. The frozen product of raw or boiled noodles of Japanese buckwheat employs, as dough materials, a mixture of at least gluten, partially decomposed substances of wheat protein, an edible oxidant and/or an edible reductant, and trehalose. More specifically, the noodles contain, as dough materials, 90-30 weight parts of buckwheat flour, 10-65 weight parts of wheat flour, 0.5-5 weight parts of gluten, 0.5-5 weight parts of an edible oxidant and/or an edible reductant, 0.5-5 weight parts of partially decomposed substances of wheat protein, and 0.5-5 weight parts of trehalose. The frozen product of boiled noodles of Japanese buckwheat is adaptable for microwave cooking.

3 Claims, No Drawings

FROZEN PRODUCT OF RAW OR BOILED NOODLES OF JAPANESE BUCKWHEAT (SOBA)

BACKGROUND OF THE INVENTION

1. Field of the Invention

The present invention relates to a frozen product of raw or boiled noodles of Japanese buckwheat (soba).

2. Description of the Related Art

In boiled noodles, a proper resistance to the teeth, i.e., a certain level of stiffness with a sufficient elasticity, is generally demanded and medium or rather-hard wheat flour having a relatively high protein content is used as a main material. To improve the feel in eating, for example, potato starch, waxy cornstarch, tapioca starch, etc. are added to wheat noodles (udon) for increasing glutinosity, and vital gluten separated from wheat flour is added to Chinese noodles and soba for increasing the resistance to the teeth. Also, an agent for improving the noodle quality is proposed in which viscosity-increasing polysaccharides, whey minerals, and starches are mixed with whey protein.

Meanwhile, recent widespread use of microwave ovens has increased the number of kinds and the amount of frozen products. However, when noodles are frozen, icy crystals grow during preservation in the frozen state, which eventually causes separation of free water. This raises a problem that starch contained in the noodles deteriorates and the stiffness of the noodles is lost.

In commercially available boiled noodles of Japanese buckwheat (soba), because a long time is required for the production process in a factory and the distribution process after the production, the feel in eating is remarkably reduced during such a long time. Also, it is known that, in the case of eating soba in soup, for example, since noodles are dipped in the soup too long, the noodles are too softened, whereby the feel in eating is deteriorated and the taste is degraded. Further, there are quick-cooking noodles that can be cooked just by heating them with a microwave oven or hot water, or by mixing an attached source or soup with the noodles before or after heating them. Those quick-cooking noodles are required to have a long-term preservative ability at the normal temperature, and hence are sterilized under heating in an acidic range. As a result of such sterilization, soba loses its specific resistance to the teeth, i.e., stiffness, and the feel in eating becomes a rather crumbly. In addition, since those raw noodles are subjected to treatment for conversion to α-starch, they inherently contain water at a high content. This leads to disadvantages that the noodles tend to stick to each other, are hard to separate individually even upon pouring of hot water, and are less convenient when eating. Thus, there have been various problems that noticeably degrade the value of noodle products.

SUMMARY OF THE INVENTION

An object of the present invention is to provide a frozen product of boiled noodles of Japanese buckwheat, which has an improved feel in eating and can sustain the improved feel in eating for a long term.

Another object of the present invention is to provide a chilled or frozen product of raw noodles of Japanese buckwheat, which has an improved feel in eating when boiled and can sustain the improved feel in eating for a long term.

With the view of achieving the above objects, the inventor has intensively conducted studies on an agent and a method for improving the quality of noodles. As a result, the inventor has reached the finding that the effect of imparting a proper elasticity to noodles and improving the feel in eating, which has not been sufficiently achieved with conventional additives, can be sustained for a long time by adding a combination of particular quality improving agents to wheat flour as one main material. Further, the inventor has reached the finding that the quality improving effect is maintained after sterilization under heating and even after preservation of raw or boiled noodles in the chilled or frozen state. Based on those findings, the present invention has been made.

The present invention resides in a frozen product of raw or boiled noodles of Japanese buckwheat wherein the product is obtained by freezing raw or boiled noodles of Japanese buckwheat, which are made using, as dough materials, a mixture of at least gluten, partially decomposed substances of wheat protein (gluten), an edible oxidant and/or an edible reductant, and trehalose.

Preferably, the noodles contain, as dough materials, 90-30 weight parts of buckwheat flour, 10-65 weight parts of wheat flour, 0.5-5 weight parts of gluten, 0.5-5 weight parts of an edible oxidant and/or an edible reductant, 0.5-5 weight parts of partially decomposed substances of wheat protein, and 0.5-5 weight parts of trehalose. Thus, the present invention resides in a frozen product of raw or boiled noodles of Japanese buckwheat wherein the product is obtained by freezing raw or boiled noodles of Japanese buckwheat, which contain, as dough materials, 90-30 weight parts of buckwheat flour, 10-65 weight parts of wheat flour, 0.5-5 weight parts of gluten, 0.5-5 weight parts of an edible oxidant and/or an edible reductant, 0.5-5 weight parts of partially decomposed substances of wheat protein, and 0.5-5 weight parts of trehalose.

Preferably, the product is adaptable for microwave cooking. Thus, the present invention resides in a frozen product of raw or boiled noodles of Japanese buckwheat wherein the product is obtained by freezing raw or boiled noodles of Japanese buckwheat, which contain, as dough materials, 90-30 weight parts of buckwheat flour, 10-65 weight parts of wheat flour, 0.5-5 weight parts of gluten, 0.5-5 weight parts of an edible oxidant and/or an edible reductant, 0.5-5 weight parts of partially decomposed substances of wheat protein, and 0.5-5 weight parts of trehalose, the product being adaptable for microwave cooking.

DESCRIPTION OF THE PREFERRED EMBODIMENTS

The present invention has succeeded in achieving the above objects by adding, to main materials of noodles, various quality improving agents described below.

<Trehalose>

Trehalose used in the present invention is a non-reducing disaccharide consisted of two glucose molecules. The origin, the manufacturing method, etc. of trehalose are not limited to particular ones in achieving the objects of the present invention. Trehalose is required to, in mixing of noodle dough, stably obtain the optimum dough condition without loosing a proper elasticity of the dough. Though detailed mechanism of the action is not yet clarified, trehalose serves as a food ingredient effective to not only realize the optimum moisture adjusting function based on water retention of wheat gluten (protein) and free water generated in the dough, but also prevent surface degradation in freezing, dripping, reduction of flavor, aging of starch, degeneration of protein, etc. Further, the noticeable effect of improving the resistance against mixing can be obtained by adding trehalose of preferably not less than 0.5 weight part with respect to a total (100 weight parts) of buckwheat flour and wheat flour as main materials for the noodle dough. In other words, trehalose can be added in such a range as not adversely affecting the process of producing soba.

<Gluten>

Of proteins contained in grains such as wheat, corn and soybean, the protein of wheat contains glutenin and gliadin as main components, and it is usually called wheat gluten. The protein of corn contains zein as a main component, and it is usually called corn gluten. Those proteins are known substances and can be obtained from grains through the separation or extraction process based on the ordinary method. The wheat gluten can be employed as any of raw gluten, powdery active gluten, and denatured gluten. Raw gluten is obtained by washing wheat flour with water and separating water-insoluble protein in the wheat flour. The raw gluten may be in the viscous massive form as obtained just after the above steps, but it is preferably added in the form of powder, which is obtained by drying and pulverizing the viscous massive gluten, for preparing a homogeneous composition. Powdery active gluten is obtained by drying and pulverizing the raw gluten with, e.g., freeze drying or spray drying, so that thermal degeneration of gluten is minimized. Denatured gluten is obtained by treating the raw gluten or the active gluten with an acid, alkali, oxidant or a reductant to such an extent that gluten will not undergo changes of chemical properties, in particular, decomposition, and then drying and pulverizing the treated gluten.

<Partially Decomposed Substances of Gluten (Wheat Protein)>

Partially decomposed substances of gluten are obtained by subjecting the grain protein to a decomposition process employing one or a combination of two or more selected from among treatments with an acid, alkali, oxidant and a reductant. One practically usable method for preparing the partially decomposed substances of wheat protein is disclosed in, for example, Japanese Patent Laid-Open Publication No. 1-127032. One example preferably employed in the present invention is "Glupal 653 (trade name)" (made by K.K. Katayama Chemical Mfg. Research in Japan) that is prepared by mixing food fibers in partially decomposed substances of wheat protein, which is obtained by heating wheat protein with addition of an acid and then heating it with addition of an alkali, and that is marketed as a noodle improving agent effective in providing a proper elasticity and preventing the noodles from loosing stiffness while they are dipped in hot water or boiled.

For ensuring the effect of improving the noodle quality, a mixing ratio of the partially decomposed substances of wheat protein and the wheat gluten is preferably set such that the wheat gluten is in the range of 0.3 to 5 weight parts with respect to 1 weight part of the partially decomposed substances of wheat protein. Also, in general, quality improving agents containing, as effective components, the partially decomposed substances of wheat protein and the wheat gluten are each preferably added in the range of 0.1 to 7 weight parts, more preferably in the range of 0.5 to 5 weight parts, to total 100 weight parts of soba flour and wheat flour in the noodles. If the amount by which the partially decomposed substances of wheat protein and the wheat gluten are each added is less than the lower limit, the effect of improving the noodle quality would be insufficient, and if the amount exceeds the upper limit, a further improvement in the effect corresponding to an increased of the amount added would not be expected.

<Edible Oxidant and/or Edible Reductant>

An oxidant used as an additive to the noodle dough serves a compound for depriving S—H of (—H) in the cross-linking reaction of gluten. Examples of the usable oxidant include dehydroascorbic acid (oxidation type vitamin C) and ascorbate oxidase that is an enzyme for producing oxidation type vitamin C. A reductant used as an additive to the noodle dough serves a compound for giving S—S with (—H) in the cross-linking reaction of gluten. Examples of the usable reductant include cystine hydrochloride (L-cystine) and ascorbate Na.

In the S—H and S—S substitution reactions, the noodle dough is softened using a reductant, and thereafter strong binding is produced in the noodle dough by maximally utilizing the S—S bond based on the effect of an oxidant. One preferable example of the noodle production improving agent having such a function is "LSupport Noodle A (trade name)" (made by Okumoto Milling K.K.) that contains wheat flour, ascorbate Na, and L-cystine.

The quality improving effect obtained by the present invention is achieved only when gluten, an edible oxidant and/or an edible reductant, partially decomposed substances of wheat protein, and trehalose are combined with each other at a predetermined mixing ratio. Though detailed action produced by those components is not yet clarified, it is deemed that the unique action is developed with mixing of the four components. Noodles to which the present invention is applied are ones of Japanese buckwheat (soba) which are preserved in the frozen state while being raw or after boiling. A manner of boiling the noodles is not limited to a particular one, and the boiled noodles can be obtained from raw noodles, frozen raw noodles, half-dried noodles, and dried noodles by a conventional boiling method.

The above-described additives can be added to the main materials of the noodles beforehand. Alternatively, it is also possible to disperse the additives in water under preparation, and to add the water containing the additives to the main materials. After thus adding the additives to the main materials, noodles of Japanese buckwheat (soba) are prepared from the mixed materials.

So long as the effect intended by the present invention is not impaired, other additives than the above-described components can also be added, which include, e.g., an emulsifier (such as glycerin fatty acid ester, sucrose (cane sugar) fatty acid ester, polyglycerin fatty acid ester, or propyleneglycol fatty acid ester), a viscosity-increasing stabilizer (xanthane gum, guar gum, carrageenan, or alginic acid), startch and processed starch having been subjected to, e.g., hydrolysis, an anticeptic, a colorant, and spices. It is however desired that those other additives be not employed as far as possible.

A method for producing the frozen product of raw noodles of Japanese buckwheat (soba) according to the present invention will be described below in brief.

The frozen product of raw noodles of Japanese buckwheat (soba) is produced using a material composition shown in Table 1 under conditions shown in Table 2. For reference, a manner of cooking the raw noodles is also briefly stated in Table 2.

TABLE 1

| Materials | Mixing ratio (%) | Remarks |
|---|---|---|
| Buckwheat flour | 90–30 | |
| Wheat flour | 10–65 | |
| Gluten | 0.5–5 | increases firmness in feel when eating |
| LSupport A | 0.5–5 | increases firmness in feel when eating |
| Glupal | 0.5–5 | increases firmness in feel when eating |
| Trehalose | 0.5–5 | improves freeze reservation |

TABLE 2

| | |
|---|---|
| Water | Proper amount depending on production method. (25–52% to total of the above-stated materials) |
| Others | If needed from production purpose, salt, alcohol and other additives can be added. |
| Production method (manual) | mixing → pressing (kneading) → stretching → cutting → freezing |
| Production method (mechanical rolling) | mixing → plain noodle strips → combining → stretching → cutting → freezing |
| Cooking (for reference) | boiling → stiffening in ice water → dishing-up |

The frozen product of boiled noodles of Japanese buckwheat (soba) is produced using a material composition shown in Table 1 under conditions shown in Table 3. For reference, a manner of cooking the frozen product of the boiled noodles is also briefly stated in Table 3.

TABLE 3

| | |
|---|---|
| Water | Proper amount depending on production method. (25–52% to total of the above-stated materials) |
| Others | If needed from production purpose, salt, alcohol and other additives can be added. |
| Production method (manual) | mixing → pressing (kneading) → stretching → cutting → boiling → washing and preliminary cooling → freezing |
| Production method (mechanical rolling) | mixing → plain noodle strips → combining → stretching → cutting → boiling → washing and preliminary cooling → freezing |
| Cooking (for reference) | heating in microwave oven → stiffening in ice water → dishing-up |

EXAMPLES

The present invention will be described in more detail in connection with Examples. It is to be noted that the present invention is in no way limited by the following Examples.

Example 1

Frozen Products of Soba Using Manually Producing Machine

Raw noodles of Japanese buckwheat (soba) were produced by using a material composition shown in Table 4 under conditions shown in Table 5.

One half of the produced noodles were packed per meal in a freezing-resistant bag made of a synthetic resin and preserved at −11° C. for 16 days. The other half was boiled for 40 seconds and then quickly cooled and washed with cold water (ice water). The cooled noodles were packed per meal and quickly frozen using a quick chiller, followed by preservation in the frozen state at −11° C. for 16 days.

When tasting the noodle products, the frozen product of raw noodles was boiled for 40 seconds, quickly cooled and washed with cold water (ice water), and then dished up on a bamboo basket. The frozen product of boiled noodles was thawed for 2 minutes and 30 seconds per meal in a microwave oven, quickly cooled and washed with cold water (ice water), and then dished up on a bamboo basket.

The taste of the soba thus prepared was evaluated (as sensory tests) in five stages (A to E). As a result, both the products were rated as A (good).

TABLE 4

| Materials | | | Mixing ratio (%) |
|---|---|---|---|
| Mixing | Buckwheat flour | | 80.0 |
| | Added flour (medium or rather-hard wheat flour) | | 17.5 |
| | Gluten | | 0.5 |
| | Glupal 653 | | 1.0 |
| | LSupport noodle A | | 1.0 |
| | | Subtotal | 100.0 |
| Rate of water added | Salt | 0.0 degree | |
| | Salt water | 0 degree | |
| | Dye | % relative to flour | 0.0 |
| | Trehalose | % relative to flour | 1.0 |
| | Alcohol | % relative to flour | 0.0 |
| | Fresh water | | |
| | | Total | 147.0 |

TABLE 5

| Step | | |
|---|---|---|
| | Mixing | 5 minutes |
| | Dividing | Dough is divided in units of 2–3 kg |
| | Pressing | Manual kneading |
| | Stretching | Repeat rolling in lengthwise and widthwise directions alternately from 1-stage rolling. Sprinkle flour during rolling. Use rods for rolling from the middle and pass dough lengthwise. Finish to about 1.6-mm thickness. |
| | Cutting | Cutting at width of about 2.5 mm |

Example 2

Sensory tests were conducted to confirm which one of materials affects the taste and the feel in eating. Table 6 shows results of the sensory tests.

Raw noodles of Japanese buckwheat (soba) were produced in a similar manner to that in Example 1. The produced raw noodles were boiled for 40 seconds and then quickly cooled and washed with cold water (ice water). The cooled noodles were packed per meal and quickly frozen using a quick chiller, followed by preservation in the frozen state at −11° C. for 16 days.

When tasting the noodle product, the frozen noodles were thawed for 2 minutes and 30 seconds per meal in a microwave oven, quickly cooled and washed with cold water (ice water), and then dished up on a bamboo basket.

The evaluation of the taste and the feel in eating by the sensory tests was rated in five stages (A to E).

TABLE 6

| | Rated item | | | | |
|---|---|---|---|---|---|
| Materials used | Cutting by Teeth | Stiffness | Touch by tongue | Flavor | Resistance to loss of stiffness |
| (Group I) | | | | | |
| Trehalose | A | A | A | A | A |
| Gluten | | | | | |
| Glupal 653 | | | | | |

TABLE 6-continued

| Materials used | Cutting by Teeth | Stiffness | Touch by tongue | Flavor | Resistance to loss of stiffness |
|---|---|---|---|---|---|
| LSupport noodle A (Group II) | | | | | |
| Trehalose Gluten Glupal 653 (Group III) | B | B | B | B | C |
| Trehalose Gluten LSupport noodle A (Group IV) | C | B | B | B | C |
| Trehalose Gluten | D | D | D | C | D |

(A: good B: rather good C: medial D: rather bad E: bad)

As described above, the present invention can provide a frozen product of boiled noodles of Japanese buckwheat (soba), which has an improved feel in eating and can sustain the improved feel in eating for a long term. Also, the present invention can provide a chilled or frozen product of raw noodles of Japanese buckwheat (soba), which has an improved feel in eating when boiled and can sustain the improved feel in eating for a long term.

What is claimed is:

1. A frozen product of raw noodles of Japanese buckwheat, which are made from dough, consisting of: 90-30 weight parts of buckwheat flour, 10-65 weight parts of wheat flour, 0.5-5 weight parts of gluten, 0.5-5 weight parts of an edible oxidant and/or an edible reductant, 0.5-5 weight parts of partially decomposed substances of wheat protein, and 0.5-5 weight parts of trehalose, wherein the product is obtained by freezing raw noodles of Japanese buckwheat.

2. A frozen product of boiled noodles of Japanese buckwheat, which are made from dough, consisting of: 90-30 weight parts of buckwheat flour, 10-65 weight parts of wheat flour, 0.5-5 weight parts of gluten, 0.5-5 weight parts of an edible oxidant and/or an edible reductant, 0.5-5 weight parts of partially decomposed substances of wheat protein, and 0.5-5 weight parts of trehalose, wherein the product is obtained by freezing boiled noodles of Japanese buckwheat.

3. A frozen product of boiled noodles of Japanese buckwheat according to claim 2, wherein the product is adaptable for microwave cooking.

* * * * *